United States Patent [19]

Björkman et al.

[11] 4,309,606
[45] Jan. 5, 1982

[54] MEASURING PLATE THICKNESS

[75] Inventors: Simon J. Björkman, Norrköping; Georg S. Jonsson; Per S. R. Rundquist, both of Nyköping, all of Sweden

[73] Assignee: Aktiebolaget Atomenergi, Stockholm, Sweden

[21] Appl. No.: 855,800

[22] Filed: Nov. 29, 1977

[30] Foreign Application Priority Data

Dec. 6, 1976 [SE] Sweden ............................ 7613688

[51] Int. Cl.$^3$ .................... G01D 18/00; G01N 23/00
[52] U.S. Cl. .................................. 250/252; 250/358 R
[58] Field of Search ............. 250/358 R, 359, 252, 250/369, 362, 336, 374; 328/117, 127

[56] References Cited

U.S. PATENT DOCUMENTS

| | | | |
|---|---|---|---|
| 3,046,402 | 7/1962 | Cherry | 250/358 R |
| 3,270,205 | 8/1966 | Ladd et al. | 328/117 |
| 3,531,643 | 9/1970 | Bretonniere et al. | 250/358 R |
| 3,634,688 | 1/1972 | Di Rocco | 250/366 |
| 3,757,122 | 9/1973 | Bossen et al. | 250/358 |
| 3,814,937 | 6/1974 | Lowes | 250/374 |
| 3,953,736 | 4/1976 | Kubisiak et al. | 250/358 R |
| 4,047,029 | 9/1977 | Allport | 250/358 R |
| 4,119,846 | 10/1978 | Outhwaite et al. | 250/358 R |

OTHER PUBLICATIONS

B. V. Rybakow (Editor), Scintillation Method in Radiometry, 1961, AEC-tr-5259, pp. 245-247.

*Primary Examiner*—Alfred E. Smith
*Assistant Examiner*—Carolyn E. Fields
*Attorney, Agent, or Firm*—Burns, Doane, Swecker & Mathis

[57] ABSTRACT

The thickness of a hot metal plate is measured during rolling by determining the absorption by the plate of gamma radiation transmitted through the plate, the gamma radiation having at least one characteristic energy. A measurement value of the intensity of the radiation after passage of the plate is provided by digitally counting pulses generated by a radiation detector. Essentially only pulses which belong to the photopeak of said at least one characteristic energy in the pulse spectrum obtained from the detector are counted. The counted number of pulses is corrected for dead time losses by using a live time counter.

Corrected mass absorption coefficients corresponding to partial thickness ranges within the total thickness range are calculated from the measured intensity of radiation passed through calibrating plates of differing thicknesses.

17 Claims, 10 Drawing Figures

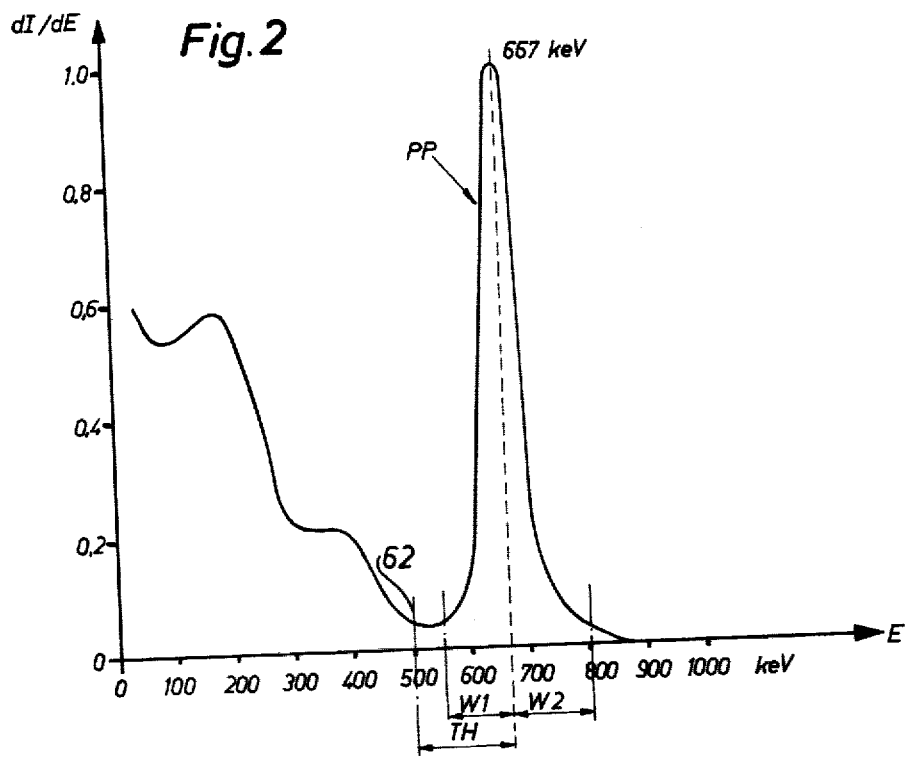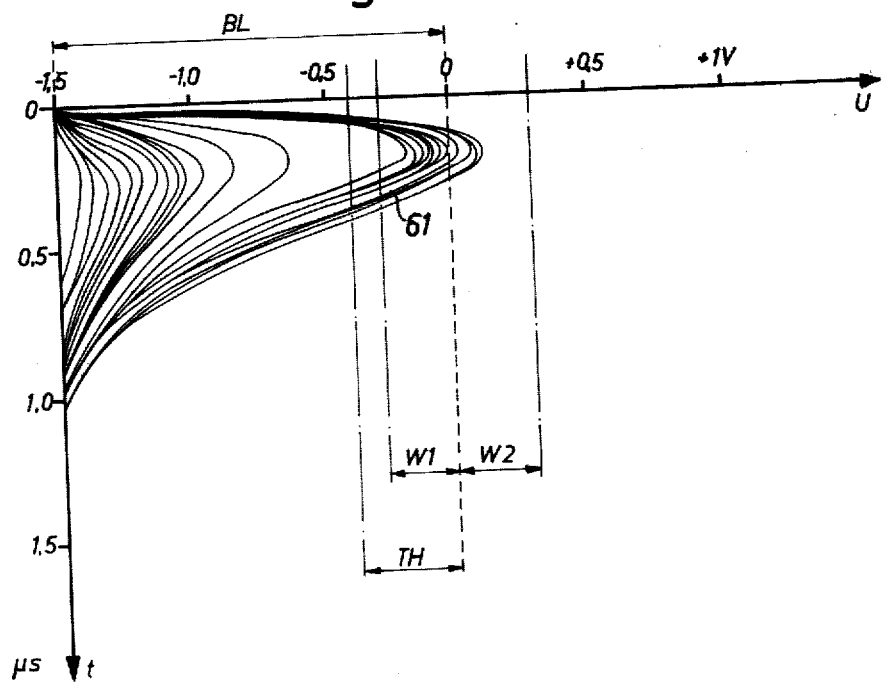

MEASURING PLATE THICKNESS

The present invention relates to the measurement of plate thickness, more especially the measurement of a hot plate during rolling. The invention relates in particular to a method of carrying out such measurement, which includes the determination of the plate absorption of electromagnetic radiation, especially the radiation from a radioactive preparate, transmitted through the plate, in which method, in order to determine the absorption, a measured value of the intensity of the electromagnetic radiation after passage through the plate, is determined, as well as to an apparatus for implementing such a method.

It is previously known to measure plate thickness by the aforementioned technique in rolling mills. In doing so, with each occasion of measurement, a suitably chosen piece of absorption plate is arranged in the path of the radiation along with a plate which is to be measured, so that a total absorption is obtained which is within a predetermined range selected while considering the measuring equipment. Although this method has in principle made it possible to measure plate thickness within a large range of thicknesses, the measuring technique has shown itself to possess a number of drawbacks. One of these is that a large number of calibrated absorption plates are required with consequent complication of the measurement procedure and measurement equipment. Furthermore, frequently repeated calibration measurements are required. In addition, the measurement sensitivity is reduced in the situation where it is most needed, namely at small thicknesses, because of the fact that in this situation a thick absorption plate must be introduced into the radiation path. Finally, since the intensity measurement value obtained is an analog value (generally being produced by means of a photomultiplier tube), serious drift or offset problems can occur as a consequence of the particular temperature conditions in rolling mills. Overall, this has meant that the operational efficiency and accuracy of measurement of practical systems have hitherto not been satisfactory.

The object of the present invention is consequently to provide a novel, improved system for the measurement of plate thickness, which makes it possible to effect measurement over a wide thickness range with high accuracy, is simple to calibrate and requires recalibration only at relatively long intervals of time, requires no use of absorption plates in the radiation path along with the plate being measured, and furthermore is easy to handle and exhibits a high degree of reliability.

In accordance with the invention, this object is achieved by means of a method and an apparatus which exhibit the features set out in the appended claims.

The method in accordance with the invention is accordingly essentially characterized in that an intensity measurement value is determined by counting digital pulses produced through radiation detection, in which context only those pulses are counted which correspond to detected radiation having an energy falling within a certain energy interval around at least one energy level characteristic of the electromagnetic radiation, the detected radiation having an energy spectrum comprising said at least one characteristic energy. In other words, in essence only those pulses are counted which correspond to total absorption of radiation corresponding to said at least one characteristic energy at the radiation detection. Preferably, essentially only those pulses will be counted which correspond with the photo-peak of the said at least one characteristic energy, occurring in the pulse spectrum (this being defined as pulse intensity as a function of radiation energy) obtained after radiation detection.

The selection of predetermined pulses for counting is advantageously performed in accordance with the present invention by producing at the time of radiation detection pulses whose amplitudes are radiation energy related, and by passing, in order to calculate the measured value, only those pulses onwards whose amplitude exceeds a given value or size or, alternatively, lies within a value range which is in a predetermined relationship to the value of the amplitude of the generated pulses which directly correspond to radiation having the said at least one characteristic energy. Accordingly, in accordance with the invention it is suitable to detect amplification-related changes in the amplitude of pulses generated at the radiation detection and, in dependency thereon, to stabilize the measuring process in order to maintain the predetermined relationship between the said value or value range and the value of the amplitude of the generated pulses which directly correspond with said at least one characteristic energy. In this context, the term amplification is used in a very broad sense and comprises for example both the inherent amplification in the detection process itself and the subsequent separate amplification before the size of the amplitude of the generated pulses is appropriately detected and related to the said value or value range.

In accordance with the invention, it has been found advantageous for the purpose of the aforementioned stabilizing to count a first number of detected pulses, whose amplitude falls within a first stabilizing value range located to one side of and preferably adjoining a given value which is intended to correspond to the amplitude of generated pulses directly corresponding to radiation having a special, characteristic energy, and to count a second number of pulses whose amplitude falls within a second stabilizing value range located to the other side of and preferably adjoining said given value, and to compare said first and second numbers and, if the comparison shows that a predetermined ratio does not exist between said numbers, to generate or modify a control signal in order to change the ratio between the value of the generated pulses and said given value so that a predetermined ratio between said first and second numbers is achieved. Preferably, the control signal will be arranged to change the amplification so that the amplitude of the generated pulses is maintained constant for one and the same radiation energy. Equally, however, it is possible to use the control signal in order in a suitable fashion to change both the said value (or value range) and said given value (and, of course, consequently, the position of the two stabilizing value ranges).

The special characteristic energy will preferably be the same as said at least one characteristic energy, however, it is conceivable that a radiation could be used which includes on the one hand a first characteristic energy with a first photo-peak, which is used purely for the direct absorption determination, and on the other hand a second characteristic energy with a different photo-peak, which is used purely for stabilization purposes. In the latter case, the electromagnetic radiation could be obtained from a radioactive source containing two different radioactive isotopes.

In order for the aforementioned stabilizing to be carried out it will be realized that some radiation must be detected. This is of course the case when carrying out plate measurement so that stabilizing can take place during measurement. However, it is desirable to achieve stabilizing during a certain time prior to a measurement, and stabilizing should then be based upon detected radiation having an intensity of the same kind of value as that occurring during measurement. For this purpose, it has been found advantageous in accordance with the invention to arrange that prior to a counting operation for determining the radiation intensity after passage through a plate whose thickness is to be measured, the radiation is appropriately attenuated by a predetermined extent corresponding to a plate thickness within a predetermined thickness measurement range, and thus to bring about said stabilizing.

In order to make it possible to calculate the thickness of a measured plate, it is convenient to perform calibration measurements on calibration plates of known thicknesses and densities. In accordance with the invention, such measurements are performed so as to produce calibration intensity values for calculation of a corrected mass absorption coefficient for a thickness range within which a plate thickness for measurement falls, to be used together with a corresponding calibration intensity measurement value in the calculation of a measured plate thickness based upon the intensity measurement value for the plate in question.

In accordance with the invention, it has been found advantageous in this context, in association with the calibration measurements, to likewise determine an intensity measurement value using radiation temporarily attenuated by the said predetermined extend, which intensity measurement value forms a first normalizing value; to determine an intensity measurement value in association with such temporary attenuation of the radiation prior to a counting operation, which intensity measurement value forms a second normalizing value; and to normalize the intensity measurement value obtained in the counting operation by multiplying the obtained intensity measurement value by a factor equal to the quotient of the first normalizing value and the second normalizing value.

In order to increase the accuracy of each intensity measurement value obtained during a counting operation, these values being obtained by counting selected detection pulses during a predetermined period of time, it is advantageous, prior to further use, to correct the measured value which thus consists of a counted number of pulses, for what are known as dead time or counting losses. In accordance with the invention, this is advantageously brought about by arranging that during a counting operation the live time is determined, that is to say the active time between the dead times which are associated with each counted pulse, and that thereafter the counted number of pulses is divided by the resultant live time in order to obtain the required radiation intensity expressed in the form of pulses per unit time.

In accordance with the invention, the live time can be quite simply determined by counting clock pulses during the spaces or intervals between the counted intensity pulses, the predetermined period of time being determined by counting clock pulses until a predetermined number has been reached.

The apparatus in accordance with the invention comprises a radiation source for the emission of electromagnetic radiation with at least one characteristic energy, a radiation detector for detection of electromagnetic radiation incident upon it and means for the separate arrangement or mounting of the radiation source and the radiation detector so that a plate can be placed between them and so that radiation from the source is directed onto the radiation detector and passes through a plate thus placed, and is essentially characterized in that the radiation detector is arranged to generate pulses in correspondence with the detected radiation intensity, the amplitude of which pulses is radiation energy related; in that it includes a circuit for counting pulses generated by the radiation detector, the circuit including means sensitive to pulse amplitude in order to pass, for counting, to a pulse counter, only those pulses whose amplitude corresponds with a radiation energy within a specific energy range around said at least one characteristic energy, or, in other words, essentially only pulses which belong to the photo-peak of the detector, corresponding with said at least one characteristic energy.

Suitably said pulse amplitude sensitive means in accordance with the invention comprise means, preferably pulse amplitude discriminator means, for comparing the value or size of the amplitude of the generated pulses and at least one reference or threshold value.

The apparatus in accordance with the invention advantageously comprises stabilizing means for detecting amplification-related changes in the amplitude of the generated pulses and for stabilizing, in response to same, the ratio between the value of the amplitude for each generated pulse corresponding with a specific radiation energy, and said reference value. The said stabilizing means are preferably arranged to control by means of generated control signal, the pulse amplification either in or after the detector.

The said stabilizing means can in accordance with the invention advantageously comprise a first pulse amplitude selector circuit in order, from the detected radiation energy related pulses, to select a first number of pulses which corresponds with a first energy range to one side of a special characteristic energy, and a second pulse amplitude selector circuit in order, from the detected radiation energy related pulses, to select a second number of pulses which correspond with a second energy range to the other side of the special characteristic energy, as well as comparator means for counting and comparing the first and second numbers of pulses. The energy ranges preferably are identical and symmetrically located in relation to the special characteristic energy within the photopeak belonging to this characteristic energy and occurring within the pulse spectrum of the radiation detector.

The apparatus in accordance with the invention furthermore advantageously includes a diaphragm as well as a mechanism for selectively introducing the diaphragm into the radiation path between the radiation source and the radiation detector. The diaphragm makes it possible to selectively attenuate the radiation emitted by the source when there is no plate in the radiation path, so that said stabilization means can be switched in. The diaphragm furthermore makes it possible to normalize the obtained measurement values.

The apparatus in accordance with the invention can furthermore advantageously comprise means in order, during a counting operation, to simultaneously determine the live time between pulses counted into the pulse counter, this making it possible to make a dead time correction of the number of pulses obtained during the counting operation. The said means conveniently comprise a live time counter for counting clock pulses from a clock pulse generator controlled by pulses counted into the pulse counter. Conveniently, in this context means are provided for determining the time of a counting operation by counting clock pulses from the clock pulse generator.

The radiation source can advantageously be a radioactive isotope emitting gamma radiation. A particularly suitable isotope is Cs-137. Other possible isotopes, however, are Am-241 and Co-60.

The radiation detector can advantageously be a scintillation detector. However, semiconductor detectors of silicon or germanium or other energy-sensitive pulse detectors can also be used.

The invention will be described in the following in more detail by way of an example while referring to the accompanying drawing, in which:

FIG. 1 consisting of FIGS. 1A and 1B is a block diagram of a system for measuring plate thickness, which system embodies the principles of the present invention.

FIG. 2 is a graphical representation of the pulse spectrum obtained after the radiation detector in the system of FIG. 1, that is to say the relationship between pulse intensity and radiation energy.

FIG. 3 is a graphical representation of the time-based amplitude characteristics of the pulses obtained in the system of FIG. 1, this being the kind of characteristic which would be obtained on an oscilloscope for example if the time base of the oscilloscope was started for each pulse by the pulse itself. FIG. 3 is aligned with FIG. 2 in such a fashion that the radiation energy axis in FIG. 2 corresponds directly with the amplitude axis in FIG. 3. FIG. 3 furthermore illustrates how pulses are selected respectively for counting the measurement value and for generating the control signal.

Figure 9:
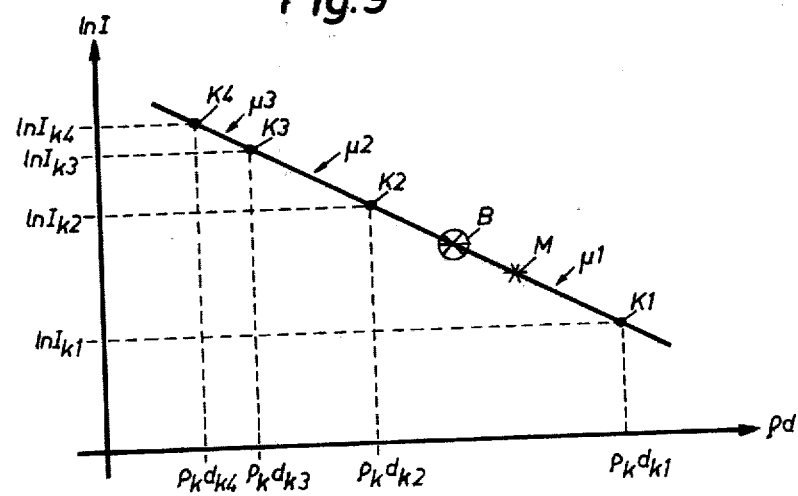

Finally FIG. 9 is a graphical representation illustrating calibration, normalization and measurement in association with determination of the thickness of a plate.

Figure 1A:
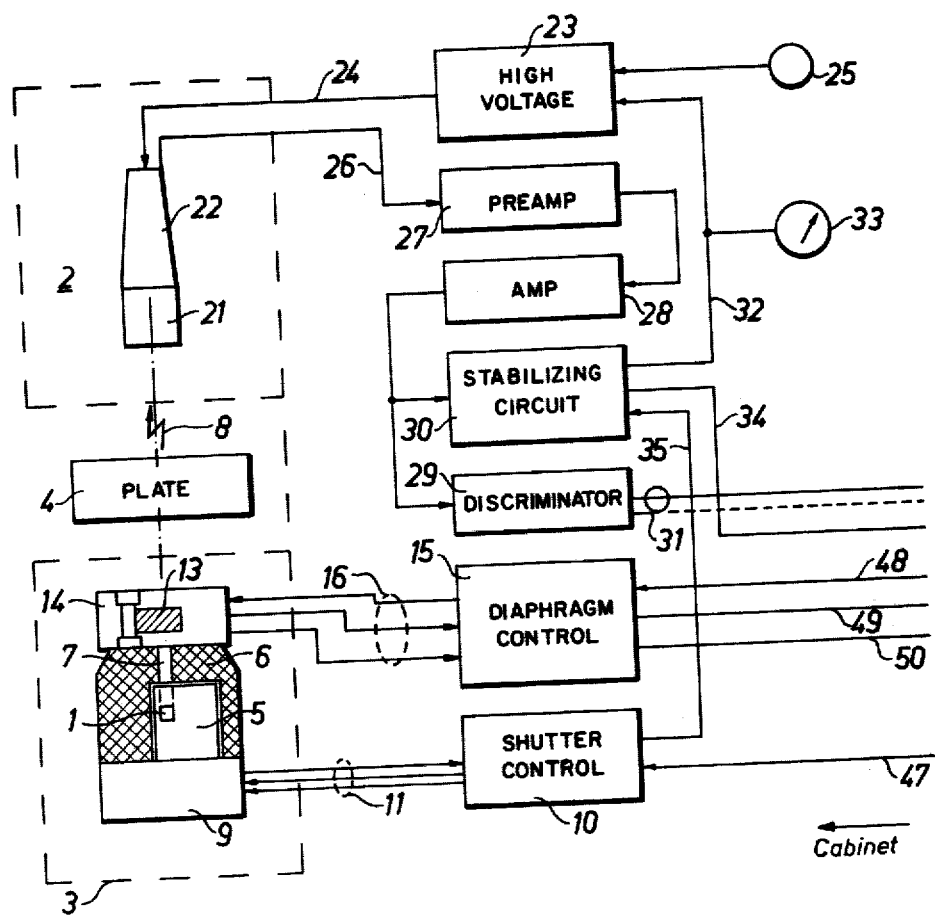
Figure 1B:
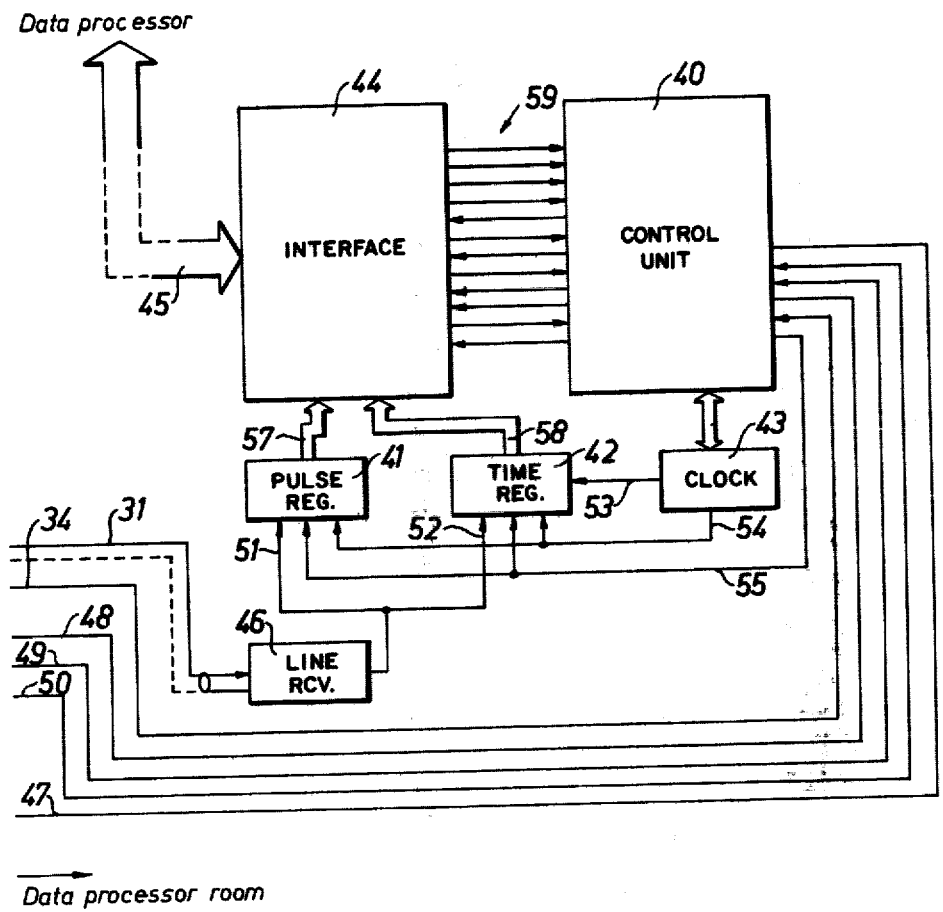

The block diagram shown in FIG. 1 relates to a system for measuring the thickness of a hot plate whilst it is being rolled in a steel mill. A radiation source 1 and a radiation detector 2 are arranged on a measurement carriage indicated simply in broken line. The carriage is designed so that during measurement it moves the radiation source 1 and the detector 2 into respective positions at either side of a plate whose thickness is to be measured. A plate has been illustrated schematically at 4.

The radiation source consists of a radioactive preparate containing Cs 137, which emits gamma radiation ($\gamma$-radiation) with a characteristic energy of 662 keV. The radioactive preparate is arranged on a shutter 5 inside a lead casing 6 in which a vertical collimating passage 7 is located. The shutter 5 can be rotated between two positions and in one of them, the "open" one, the radiation source is in a position to emit a gamma beam 8 through the collimator passage 7 onto the detector 2 through a plate 4 on which measurement is to be carried out, whilst in the other of which, the "closed" position, the source is in such a position that no radiation exits through the collimator passage. The shutter 5 is rotated by means of a conventional rotating mechanism 9 controlled by a shutter control circuit 10 via connecting leads 11. The shutter mechanism incorporates a conventional positional switch in order to supply the shutter control circuit 10 with a signal when the shutter is in the closed position.

Above the collimator passage 7 there is a diaphragm 13. The diaphragm is constituted by an about six cm thick steel plate and can be displaced between two positions by means of a diaphragm mechanism 14. In a first "closed" position, the diaphragm is in the radiation path above the collimator passage so that the narrow beam 8 of gamma radiation from the radiation source 1 has to pass through it and is attenuated by it. In a second, "open" position the diaphragm is no longer in the radiation path so that the gamma radiation 8 can pass freely by it. The diaphragm mechanism can conveniently include a spring which biases the diaphragm into the closed position and a pneumatically actuated piston in order to drive the diaphragm aside into the open position. The diaphragm mechanism 14 is controlled by a diaphragm control circuit 15 via connecting leads 16. The diaphragm mechanism includes conventional positional switches in order to supply a first signal to the diaphragm control circuit when the diaphragm is in the closed position, and a second signal when the diaphragm is in the open position.

The radiation detector 2 is a scintillation detector consisting of a 3 inch NaI crystal 21 coupled to a photomultiplier tube 22 operating in pulse mode. The detector is supplied with high voltage from a high voltage circuit 23 through a lead 24. The high voltage can be adjusted manually by means of suitable control elements 25.

Pulses obtained from the detector 2 are supplied through a lead 26 to a preamplifier 27 and thence to a main amplifier 28. The thus amplified pulses are supplied on the one hand to a discriminator and line-drive circuit 29 and on the other to a stabilizing circuit 30. The circuit 29 selects pulses whose amplitude exceeds a predetermined threshold level, as will be described in more detail later on (compare however FIGS. 2 and 3), and transmits the thus selected detector pulses on a coaxial cable 31 for counting.

In a manner which will likewise be described later on in more detail, the circuit 30 selects pulses having amplitudes falling within predetermined amplitude ranges which are related to the photopeak in the detected pulse spectrum (see FIGS. 2 and 3), and on this basis generates an amplitude-related control signal. This control signal is applied through a line 32 to the high voltage circuit 23 in order to influence the high voltage so that the overall pulse amplification remains constant. An indicating instrument 33 is included to display the control signal. The circuit 30 is further designed to transmit a fault signal on a line 34 when the control signal reaches either of two terminal conditions. The circuit 30 is furthermore designed to receive, through a line 35 from the shutter control circuit 10, a "shutter closed" signal, when the shutter 5 is in its closed position, and in response thereto to deactivate the amplification control at a predetermined value on the part of the control signal.

The system components or circuits thus far described are arranged in the carriage 3 or in an adjacent measurement cabinet. The system also however includes signal-processing and control circuits which can advantageously be arranged in a data-processor or computer room, that is if a data-processor is intended to be used for the actual plate thickness calculations.

The signal-processing and control circuits comprise a control unit 40, a pulse register 41, a live time register 42, a clock circuit 43 and a data interface circuit 44. The data interface circuit is connected to a data-processor (not shown) via a data bus 45. In order to receive detected pulses selected for counting, a line receiving circuit 46 is provided which is connected to the coaxial cable 31.

A number of control signals are transferred between the control unit 40 and the data processor, that is, between the control unit and the interface circuit 44, as indicated at 59. The control signals include (from the top to the bottom) the following: Start measurement, 1 sec.; Start measurement, 2 sec.; Start measurement, 4 sec.; Open shutter; Data ready; Data read; Live time ready; Live time read; Diaphragm closed; Diaphragm open; Open diaphragm; Fault.

The control unit 40 is connected to the equipment in the carriage and the cabinet, through a number of control signal lines. In addition to the fault signal line 34 referred to earlier the control signal lines include a line 47 to the shutter control circuit 10 for transmitting control signals for the opening and closing of the shutter 5, a line 48 to the diaphragm control circuit 15 for transmitting a control signal to open the diaphragm 13 (the latter being closed automatically when the control signal disappears), and two further lines 49 and 50 to the diaphragm control circuit 15 for transmitting therefrom a signal "diaphragm open" or "diaphragm closed", respectively.

The detected pulses selected for counting and received in the line receiving circuit 46 are supplied on the one hand to the pulse register 41 through a line 51 and on the other to the live time register 42 via a line 52 to be counted into the register 41 and to control the counting into the register 42 of high-frequency clock pulses which latter are supplied to the register 42 from the clock circuit 43 through a line 53. Counting respectively into the registers 41 and 42 takes place however, only if a measuring time signal commanded by the control unit 40 is supplied to the registers from the clock circuit 43 through a line 54. The measuring time signal has a duration identical to the desired measuring time which is 1, 2 or 4 seconds depending upon the thickness of the plate being measured. Control of the live time register 42 is such that clock pulses can only be counted in if there is no detected pulse present on the line 52. The registers 41 and 42 can be zeroed or reset by a signal from the control unit 40, applied via a line 55.

After a measuring operation, that is to say, after registers 41 and 42 have counted detected pulses and clock pulses, respectively, during the predetermined measuring time, the contents of the registers are transferred to the data-processor interface circuit 44 via datalines 57 and 58 respectively, and thence to the data-processor via the data bus 45 in order to enable an intensity measurement value, corrected for dead time, to be calculated. Such transfer as well as a proper sequential transfer of the control signals indicated at 59, between the data-processor and the control unit 40, are conventional measures as far as the person skilled in the art is concerned and therefore should not require any further description in this context.

A typical cycle in the determination of an intensity measurement value will now be described. To start with, the carriage 3 is activated in its starting position at the side of the plate track, and the measuring circuits are stabilized. In this context, first of all it is confirmed that the "diaphragm closed" signal is present, that is to say that the diaphragm 13 is in the path of the radiation, above the collimator or passage 7. Then, the signal "open shutter" is transmitted to the shutter control unit 10 so that the shutter 5 is opened by the mechanism 9 with the result that gamma radiation is transmitted from the radiation source 1 through the diaphragm 13 to the detector 2. Because the shutter is now open, the "shutter closed" signal disappears and the stabilizing circuit starts to operate. Stabilization is now allowed to continue for a suitable time, for example 1 to 2 minutes.

After this time, the carriage 3 is driven or moved into the measuring position relative to the plate upon which measurment is being carried out (this may in fact be a calibrating plate) and the "open diaphragm" signal is transmitted to the diaphragm control circuit 15 so that the diaphragm 13 is opened by the mechanism 14. Knowing the approximate thickness of the plate which is to be measured, a starting signal, containing information on the measuring time (1, 2 or 4 seconds) has meanwhile been transmitted by the data-processor to the control unit 40. When the diaphragm has moved into the open position, the signal "diaphragm open" is transmitted to the control unit. The control unit now sets and activates the clock circuit 43 so that a correct measuring time pulse is emitted on the line 54, whereby detected pulses and clock pulses begin to be counted into the pulse register 41 and the live time register 42 respectively. When the predetermined measuring time has elapsed, the measuring time pulse ceases and consequently the counting of the pulses into the register likewise ceases. It should be emphasized that the stabilizing circuit operates throughout the whole of this time and that the plate is halted during the actual measuring time.

When the measuring time has elapsed, the "open diaphragm" signal from the control circuit 40 ceases, with the result that the diaphragm returns to its closed position. This in turn means that first the signal "diaphragm open" ceases and that thereafter the "diaphragm closed" signal is transmitted to the control unit. The carriage 3 is returned to its starting position and if no new measurement is to take place in close succession, the shutter is closed by replacing the "open shutter" signal with the signal "close shutter". Consequently, stabilization ceases to function because the "shutter closed" signal has been transmitted to the stabilizing circuit 30 from the shutter control circuit 10.

After the measuring time has elapsed, furthermore the contents of the registers 41 and 42 are transferred in turn to the data-processor in order to calculate an intensity measurement value, corrected for dead time, which can be used as the basis for computing a thickness value on the part of the plate which has been measured.

It should be emphasized that it is advantageously possible, principally in the same manner described earlier, to determine an intensity measurement value corrected for dead time, having only the diaphragm introduced into the radiation path, this after the requisite time for stabilizing has elapsed and before the carriage 3 has been driven into the measuring position. In this way, on the one hand a rapid and reliable test of whether or not the system is operating properly is obtained and on the other hand an intensity measurement value is obtained which can be used for normalizing purposes, as will be described later on.

The selection detector pulses for counting in order to achieve an intensity measurement value, and the automatic stabilization (control of amplification) in accordance with the invention, in the system shown in FIG. 1, will now be described in more detail while referring to FIGS. 2 to 6.

In carrying out absorption measurements on steel plate or plate made of other metals, in the system of FIG. 1, the radioactive isotope Cs-137 is used. This emits gamma radiation with a characteristic energy of 662 keV. The intensity spectrum of the gamma radiation (after detection) is shown in FIG. 2. The characteristic energy which gives rise to the so-called photopeak, marked PP in the Figure, is at such a high level that the absorption coefficient $\mu$ of the associated radiation is independent of the atomic number of the absorbing material. Measurement solely using photons corresponding with this peak can thus provide measurement values which are independent of the chemical composition of the plate being measured. In order to be able to carry out this kind of measurement, however, in accordance with the present invention the low energies in the spectrum must be separated out. This is done with the help of pulse techniques.

By means of the energy-sensitive pulse detector 2 and the amplifiers 27, 28, pulses are obtained whose amplitudes are to a certain extent proportional to the radiation energy detected in the detector. In FIG. 3 an illustration is given of how the pulses appear on an oscilloscope screen when the time base of the oscilloscope is started by the pulses themselves. The time base or time axis is disposed vertically downwards and the voltage axis U, corresponding to the horizontal energy axis E in FIG. 2, is disposed horizontally and extends from a suitably chosen staring voltage ($-1.5$ V), as will be described in more detail later on. In the illustrated case where Cs-137 is the isotope used, the pulses belonging to the photopeak PP form a limited bright band 61 illustrated by closely drawn pulse patterns in FIG. 3.

As described earlier, the determination of the intensity is achieved by counting pulses over a specific period of time. By suitably including a threshold 62, such as, for example, TH in FIGS. 2 and 3, and by counting only the pulses which exceed this threshold, it is possible to carry out absorption measurements with the, for all intents and purposes, mono-energetic photons belonging to the photopeak. As FIG. 2 shows, the threshold will conveniently be located directly before the photopeak PP substantially where the spectral curve has its lowest value.

In making thickness measurements the intensity relationship is determined by calibration techniques. For the calibration to be valid, it is necessary for the pulse amplitude for one and the same radiation energy to be fixed relatively to the threshold 62. If the pulse amplification increases, too many pulses pass the threshold, whilst if the amplification drops, too few will pass. The amplification or in other words gain in the detector and preamplifier may change for a variety of reasons. The foremost of these is to be found in temperature variations, intensity variations and spontaneous long-term drift. An apparent increase in gain is a distortion in the pulse spectrum which can occur at high intensities. Since the pulses from the detector are distributed randomly in time, it may happen that two or more pulses coincide with one another or occur closely together. These pulses pile up and give falsely high pulse amplitudes. When the pulse intensity becomes too high, this happens often and a distortion occurs in the pulse spectrum, manifesting itself in terms of the fact that the photopeak apparently flattens and drifts upwards towards higher energies. To counteract this fault, the gain must therefore be reduced in correspondence with the apparent gain increase. In the scintillation type of detector, furthermore, it also happens that the inherent gain of the photomultiplier changes in the face of major intensity variations. In order to maintain measuring accuracy it is therefore advantageous to provide automatic gain control to keep the photopeak in the desired position.

In accordance with the invention, this stabilizing is achieved by providing two windows W1 and W2 in FIGS. 2 and 3, to either side of the characteristic energy of the photopeak. Pulses occurring in these windows are fed into two channels to influence a reversible counter register. Pulses which occur within W1 cause the register to count forwards or up and pulses which occur within W2 cause it to count backwards or down. The count reached by the register is converted to a DC voltage which acts as a control signal. This control signal controls the gain in the detector or the other part of the electronic system so that like numbers of pulses belonging to the photopeak on average occur within W1 and W2. In this way, the amplitude of pulses belonging to the photopeak is locked on a predetermined value. For practical reasons it has been found convenient to arrange for the two windows to be two DC voltages at either side of the zero potential, the zero potential corresponding to the characteristic energy of the photopeak.

Figure 4:
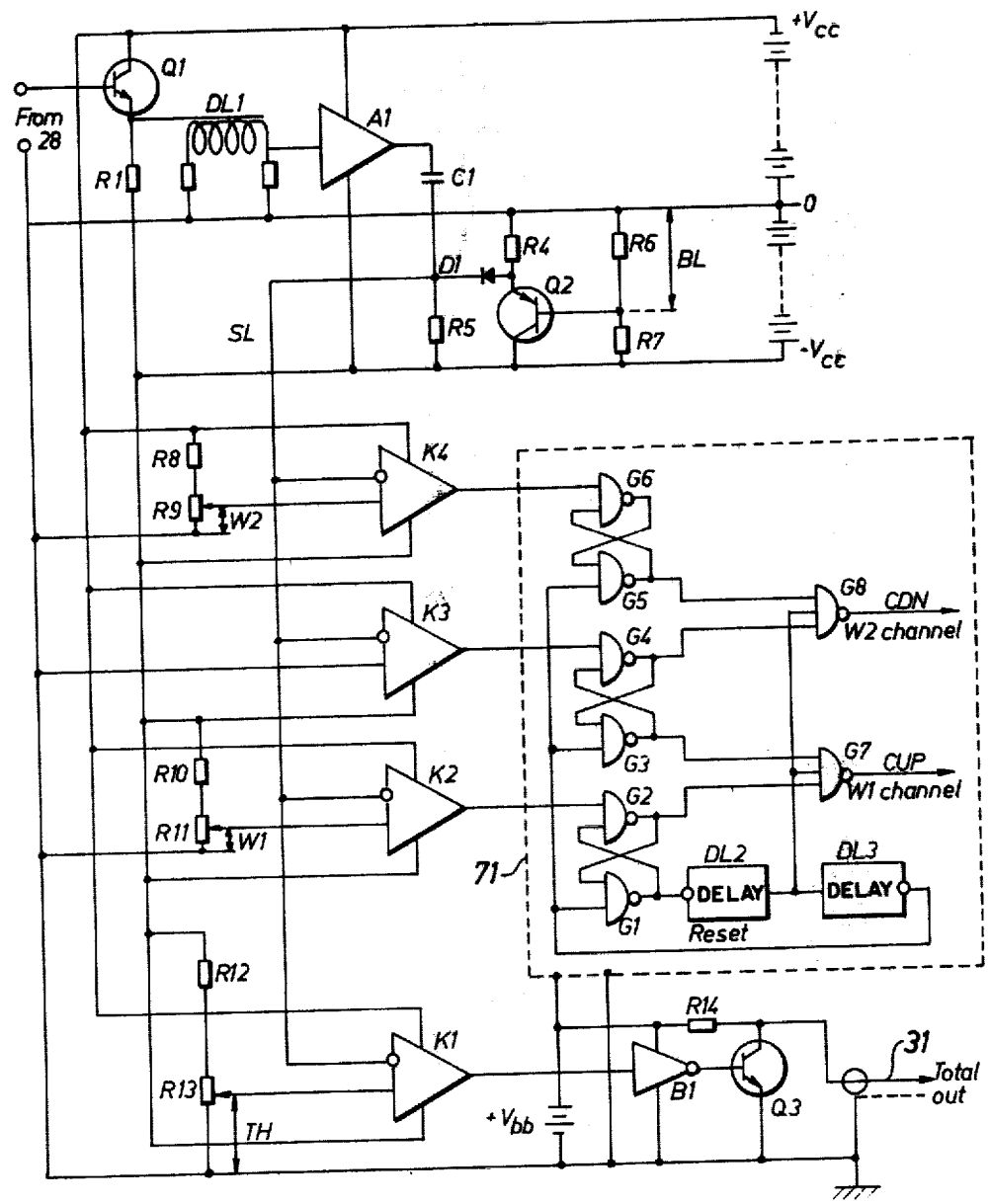
FIGS. 4 and 5 are diagrams, that in FIG. 5 being a direct continuation of that in FIG. 4, which show the construction of the discriminator, line-drive and stabilizing circuits found in the system of FIG. 1.

The special electronic circuit used in accordance with the invention for pulse selection and stabilizing, consists of a logic section which sorts the pulses out into measurement value pulses, up-counting pulses from W1 and down-counting pulses from W2, a register and converter section which, depending upon the up and down-counting pulses, generates the control voltage and, finally, a control circuit which adjusts the pulse gain to the correct value. FIG. 4 illustrates the logic section, FIG. 5 the register and converter section and FIG. 6 the control circuit.

FIG. 4 thus on the one hand shows how detector pulses corresponding to the photopeak are sorted out into two channels for up and down counting, respectively, and on the other shows how all the detector pulses which exceed the aforementioned threshold, are relayed to a total channel for counting. In FIG. 4, the reference A1 indicates a fast, linear pulse amplifier. K1-K4 are fast differential comparators which detect the voltage difference between an inverting and a non-inverting input. In the Figure, the inverting input is marked by a ring. The circuits DL1, DL2 and DL3 are delay units. DL1 is a delay line which is used here for pulse-shaping. DL2 and DL3 can be electronic circuits. DL2 and DL3 can for example each consist of two cascade-coupled monostable multivibrators. The gates G1-G8 consist of conventional integrated circuits. Like the units DL2 and DL3 they obtain their supply voltage by being connected between earth and the voltage source $+V_{bb}$. The supply lines are not shown in detail here but simply extend up to a broken-line box 71 surrounding the circuits. The amplifier A1, the comparators K1–K4 and the transistors Q1 and Q2, are supplied with the voltages $-V_{cc}$ and $-V_{cc}$. The transistor Q3 is supplied from the voltage $+V_{bb}$.

Positive detector pulses from the preamplifier 28 are applied to the base of the transistor Q1 which is in a emitter-follower arrangement. This is followed by differentiation, "clipping" of the pulses in the delay line DL1 which is connected to the emitter resistor R1 of the transistor Q1, whereafter the shaped pulses are amplified in the amplifier A1. The amplified pulses are supplied to one side of a coupling capacitor C1 whose other side, in the quiescent condition, is fixed at a base line potential BL which is negative relatively to earth. This base line potential is the same as the voltage on the base of the transistor Q2 which is connected to the junction between the resistors R6 and R7 which form a voltage-divider.

Current flows through the emitter resistor R4 of the transistor Q2 and is divided between the transistor Q2 and the diode D1 which is connected between the emitter of the transistor Q2 and said other side of the capacitor C1. The diode current further flows across the resistor R5 to $-V_{cc}$. Since the voltage drop between the emitter and the base of the transistor Q2 is approximately the same as the voltage drop across the diode D1, the potential on the signal line SL connected to D1 and C1, becomes very close to the base line potential BL.

The pulses for the total channel are obtained from the comparator K1. The non-inverting input of K1 is connected to the adjustable tap of a potentiometer R13 which is connected in series from the zero line with a resistor R12 in turn connected to $-V_{cc}$. The threshold voltage TH which in this case thus is to be slightly negative in relation to earth, is adjusted by means of the tap of the potentiometer R13. The inverting input of the comparator K1 is connected to the signal line and is normally down at the base line potential BL. Since the inverting input is thus more negative than the non-inverting, the output of the comparator K1, which is connected to an inverting buffer stage B1, is positive. The output of the inverting buffer stage B1 is consequently low and the transistor Q3 connected thereto is cut off. A detector pulse arriving via Q1, DL1, A1 and C1, and of such amplitude that it raises the signal line SL and consequently the inverting input, above the TH-level, causes the output of K1 to go low, the output of B1 to go high and Q3 to become conductive, for the length of its duration. Consequently, a negative pulse is emitted on a transmission cable 31 which goes to the circuits for counting measurement pulses.

The other comparator stages are designed and operate in the same fashion. A pulse raising the inverting input of the comparator K2 above the threshold W1 (the latter being fixed by the potentiometer R11 and the resistor R10) causes the output of the comparator to drop to a low voltage. This means that the bistable flip flop, constituted by the gates G1 and G2 and connected to the output of the comparator, is set in a state in which the output of G1 goes low and that of G2 high. After a delay, the delay circuit DL2 connected to the output of G1 supplies a positive "strobe" pulse to the gates G7 and G8. G7 passes the strobe pulse since the outputs of the gates G2 and G3, connected to this gate, both carry high potential. G3 acquired this state due to an earlier reset pulse from DL3. Thus, an up-counting pulse CUP is received in the W1 channel from G7, due to the fact that the incoming pulse had an amplitude corresponding to the window W1. After the strobe pulse from DL2 has been delayed in DL3, a negative pulse is produced which resets all the flip flops G1–G6.

If an incoming detector pulse is of such amplitude that the signal line SL is raised above the zero potential, not only does the output of the comparator K2 go low, but also that of the comparator K3 whose non-inverting input is connected to the zero potential. Both the flip flops, G1–G2 and G3–G4, consequently change state. Since the output of the gate G3 now carries low potential, the gate G7 is blocked or disabled but the gate G8 opens when the strobe pulse arrives from DL2. Thus, a down-counting pulse CDN occurs in the W2 channel because this detector pulse has fallen within the window W2.

A detector pulse which is of such amplitude that the comparator K4 also changes the state of its associated flip flop G5–G6, results in both the gates G7 and G8 being blocked when the strobe pulse arrives from DL2. The incoming pulse has overshot the window W2 whose upper threshold value is fixed by the potentiometer R9 and the resistor R8 which are connected in series between zero potential and $+V_{cc}$, so that no up- or down-counting pulse is produced.

Figure 5:
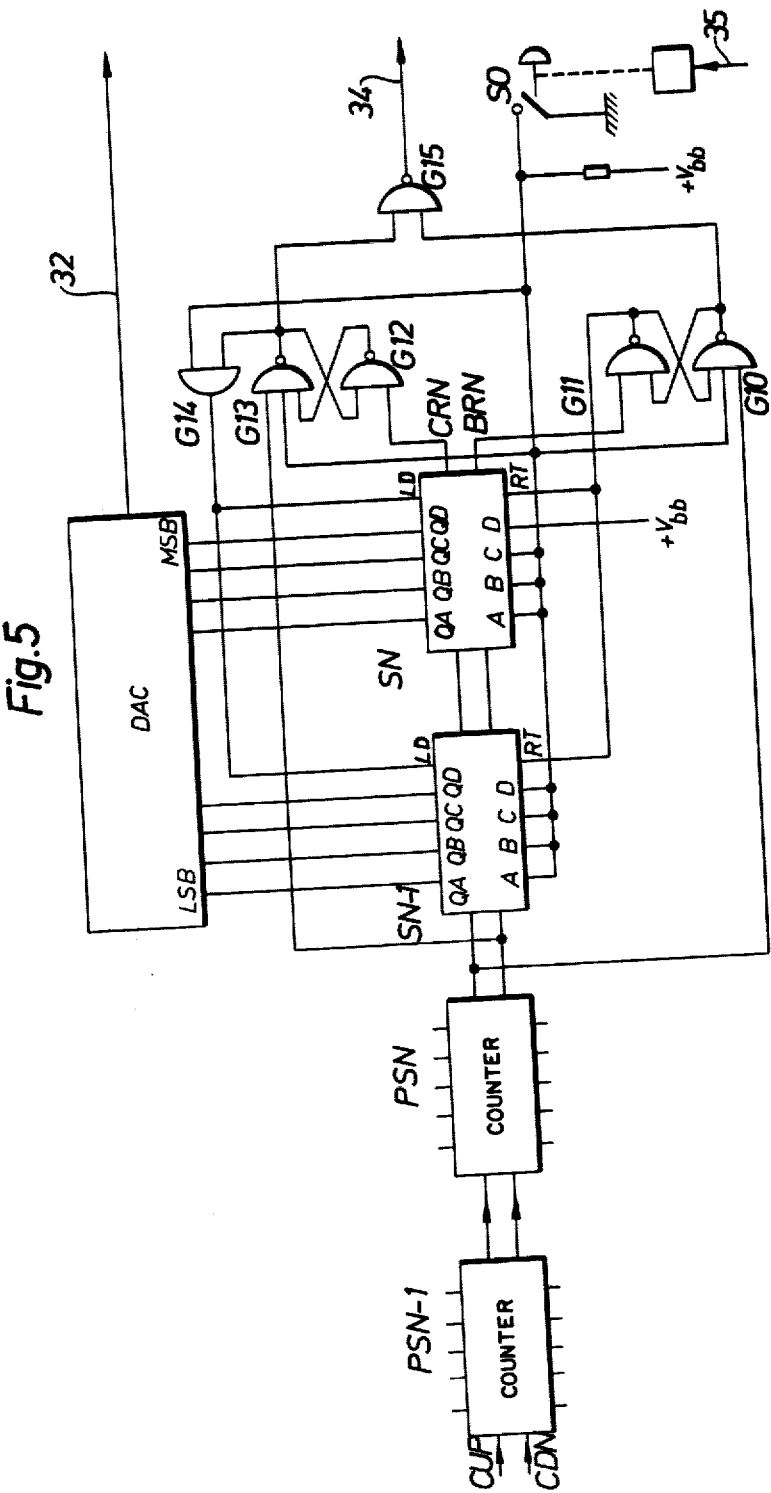
Figure 6:
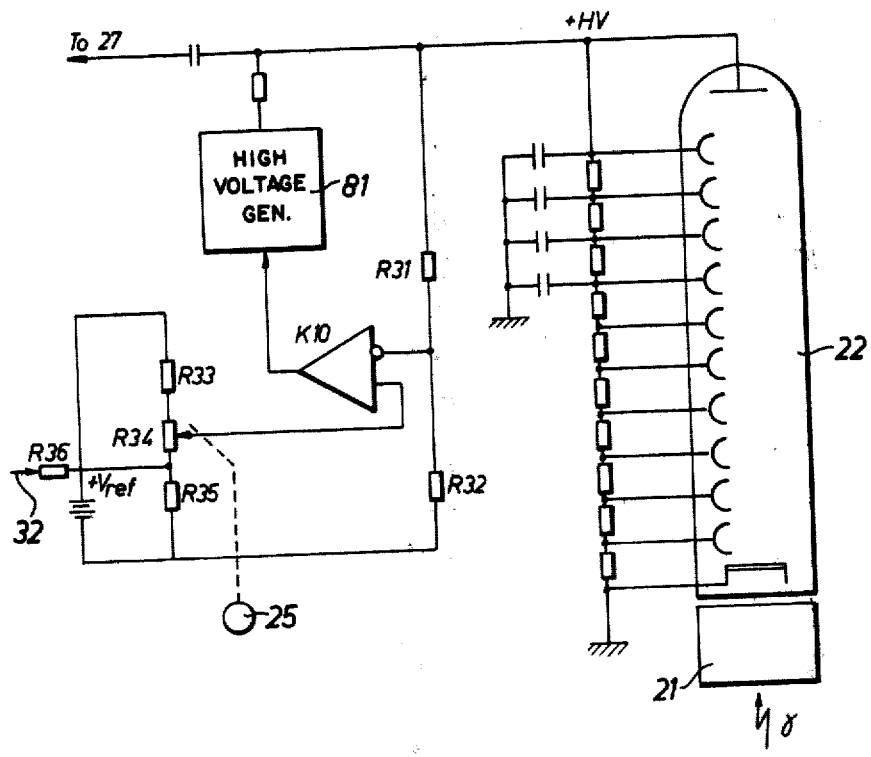
FIG. 6 is a diagram of a circuit by means of which the control signal generated in the stabilizing circuit is made to influence the high voltage circuit in the radiation detector and thus the pulse amplification in the detector.

The up- and down-counting pulses CUP and CDN are relayed to the circuit shown in FIG. 5. The pulses are here counted into the series-coupled reversible, pre-settable counters PSN-1, PSN, SN-1 and SN.

The reversible counters are constituted by Ser. No. 74193 counter units although other suitable counter units could be used instead.

The 74193 is a four-bit binary counter. It has two counting inputs one for up-counting and one for down-counting, together with corresponding outputs. When the register reaches its maximum count during up-counting, the next up-counting pulse to arrive in it produces a carry pulse. During down-counting, in a corresponding way a borrow pulse is produced when the counter reaches zero. By coupling the outputs and inputs of a counter to a following counter, long counter chains can be built up.

The counter furthermore has four data outputs and four data inputs. The data outputs QA–QD define in binary form the number of pulses stored in the counter. By applying a low voltage to a loading input LD, the state of the data inputs A–D is transferred to the data outputs. By applying a high potential to a reset input RT, all the data outputs are zeroed.

Counting of the pulses CUP and CDN commences in a pre-counter consisting of a suitable number (in the present example 2) of cascade-connected counters PSN, PSN-1. This prescaler is intended to even out the statistical fluctuations in the counting operation. The prescaler is then followed by the actual counter stages which are connected to a digital-analog converter DAC. In FIG. 5, two four-bit counters, SN-1 and SN, are used, connected to a converter with eight-bit resolution.

From the digital-analog converter a control voltage is obtained which is proportional to the content of the counters SN-1 and SN. This output voltage can be unipolar, that is to say range from 0 to a maximum value. Equally, however, it can be bipolar. Then, a centre value of the counter content yields a zero output voltage. If the counter content is greater than the centre value then the output voltage is positive. If the content is less than the centre value, then a negative control signal is obtained.

In order for the conversion to be meaningful, it is necessary for the digital counter to remain while its minimum and maximum limits. It is consequently provided with two stop flip flops G10–G11 and G12–G13, which prevent it from going below zero and stop it at its maximum. If the counters SN-1 and SN are both registering zero and an additional down-counting pulse arrives, then a borrow pulse BRN is generated. This sets the flip flop G10–G11 in such a state that the output of the gate G11 and the reset inputs RT connected to it acquire a high potential. This keeps the counters zeroed until an up-counting pulse arriving to the gate G10, resets the flip flop G10–G11 and releases the counters. The same situation arises when the counters reach their maximum count. A carry pulse CRN to the gate G12 sets the flip flop G12–G13 so that the gate G13 and the AND-gate G14 connected to it acquire a low potential on their outputs. The load inputs LD are therefore in a low state and the outputs receive the voltages carried by the data inputs A–D. Since these are all at high potential, the counter is locked at its maximum count with all outputs at high potential.

If the counter reaches either end state, stabilizing ceases to function. To indicate this condition, a gate G15 connected to the two end state flip flops, produces a fault signal.

When stabilizing starts and likewise when it is to be adjusted to a fixed value for example in association with the closing of the shutter, it is convenient to place the counter in a starting position. In FIG. 5, the counters SN and SN-1 are set to the centre or halfway count when the switch SO is closed. This earths all the data inputs except for the input D of the counter SN which input corresponds to the most significant bit. At the same time, the data load inputs LD are placed at low level via the gate G14. The counter state then becomes logic 1 for the most significant bit MSB and logic 0 for all others. The switch SO can be closed manually or automatically by a signal on the line 35 coming from the shutter control circuit.

A preferred arrangement for controlling the pulse amplification by means of the control voltage generated in the manner described above, is shown in FIG. 6. In this arrangement the control voltage is arranged to influence the high voltage to the photomultiplier tube 22 of the scintillation detector. The gain in the photomultiplier tube is dependent upon the high voltage +HV. Stabilizing of this high voltage is effected in a conventional way. Part of the high voltage is taken from a voltage-divider consisting of the resistors R31–R32 and is compared with a manually adjustable reference voltage obtained from the tap of a potentiometer R34. The potentiometer is connected in series with two resistors R33 and R35 to a voltage +$V_{ref}$. Comparison is performed in a comparator K10 which supplies a control voltage to the high voltage generator 81. By arranging for the control voltage from the digital-analog converter DAC, to act via a resistor R36 connected to the junction of the potentiometer R34 and the resistor R35, on the reference voltage, it can control the detector gain.

A circuit for counting selected detector pulses during a predetermined measuring period or time and for simultaneously determining a live time value, will now be described in more detail while referring to FIG. 7. As an introduction, however, the meaning of the expression dead time losses will be clarified.

As stated earlier, the detector pulses are distributed randomly in time, which means that pulses sometimes pile up. This not only gives rise to false pulse amplitudes which were dealt with earlier, but also to losses in pulse counting. Two or more pulses simultaneously exceeding the threshold voltage TH of FIG. 3, cannot be distinguished from one another by the comparator K1 in FIG. 4, for that reason they are treated as a single one. In order to achieve good accuracy over a wide range of intensity, it is therefore essential in accordance with the invention to compensate for these so-called dead time losses.

Dead time losses thus always occur in counting pulses from nuclear detectors. A standard formula for dead time correction is $$N_t = \frac{N_o}{1 - N_o \tau} \quad (1)$$

where $N_t$ is the true number of pulses, $N_o$ the counted number of pulses and $\tau$ the dead time associated with each counted pulse. $N_o \tau$ is thus the total dead time during a measuring period and $1-N_o \tau$ consequently the live time or active time. If we call this $t_1$ the equation (1) can also be written as $$N_t = \frac{N_o}{t_1} \quad (2)$$

If we assume that the intensity is largely constant during the measuring period, and this is the case in the present context, then the live time $t_1$ can be determined by live time counting. The circuit of FIG. 7 is designed for this purpose. A crystal-controlled clock pulse generator CK generates clock pulses of high, constant frequency. These pulses are supplied on the one hand to a timing circuit TC containing a preselect counter and on the other hand to one of the three inputs of an AND-gate G30. The length of the measuring period is determined by preselection of a number of clock pulses to be counted into the timing circuit TC. On a start signal, the timing circuit produces a positive output voltage MT which persists as long as the clock pulses are being counted in. The output voltage MT is applied to one of the inputs of the gate G30. Detector pulses which are negative and have been transmitted via the transmission line 31 from the transistor Q3 in FIG. 4, close the gate G30 for the time of their duration. Clock pulses can thus pass G30 only during the spaces between detector pulses, that is to say during the active time. Clock pulses passing the gate G30, live time pulses, in other words, are counted into a live time register LR connected to the output of the gate. When a measuring period is completed, LR contains a pulse number representative of the live time. The detector pulses have at the same time been counted in a pulse or data register PR via an AND-gate G31 whose other input is connected to the measuring time output of the timing circuit TC. An expression for the true pulse intensity expressed in pulses per unit/time can now be obtained by dividing the content of the pulse register PR by the content of the live time register.

The frequency of the clock pulses is conveniently chosen so that the content of the live time register shall be related directly to the measuring time, i.e. so that provided there are no dead time losses, the content of the live time register directly constitutes the expression of the measuring time. A preferred clock pulse frequency is 100 kHz.

As an example of the register content which can be obtained when carrying out measuring using the system in accordance with the invention, the following values can be quoted:

(a) Measurement on an approximately 0.5 cm thick plate; measuring time 1 second:

Pulse register content: magnitude 200,000

Live time register content: magnitude 90,000

The content of the live time register corresponds to a live time of 0.9 seconds.

(b) Measurement on approximately 10 cm thick plate; measuring time 4 seconds:

Pulse register content: magnitude 8,000

Live time register content: magnitude 400,000.

The content of the live time register corresponds to a live time of 4 seconds, i.e. there are no dead time losses to be included.

The duration of the detected pulses was calculated in this example to be about 0.5 $\mu s$.

Figure 7:
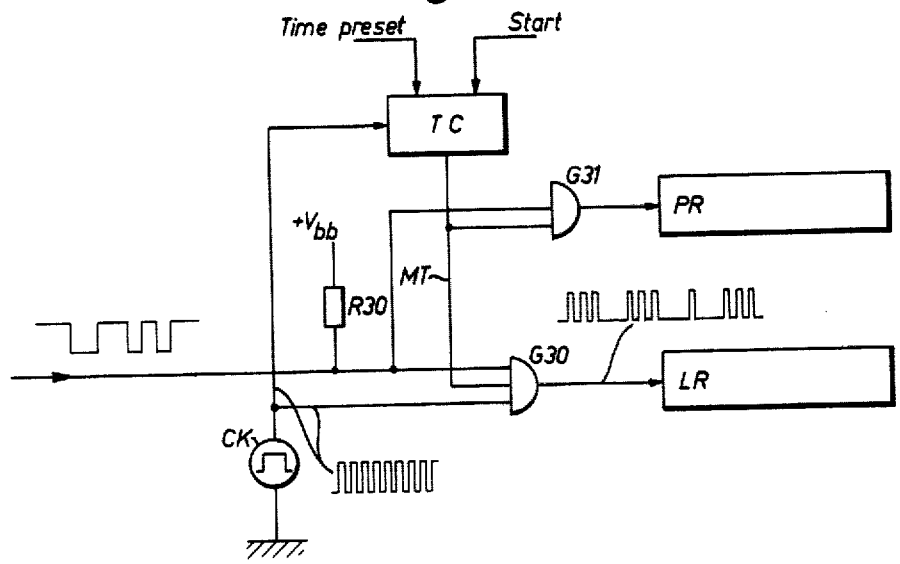
FIG. 7 is a block diagram of a first circuit for determining the measurement time as well as the live or active time during a counting operation carried out in order to determine an intensity measurement value.
Figure 8:
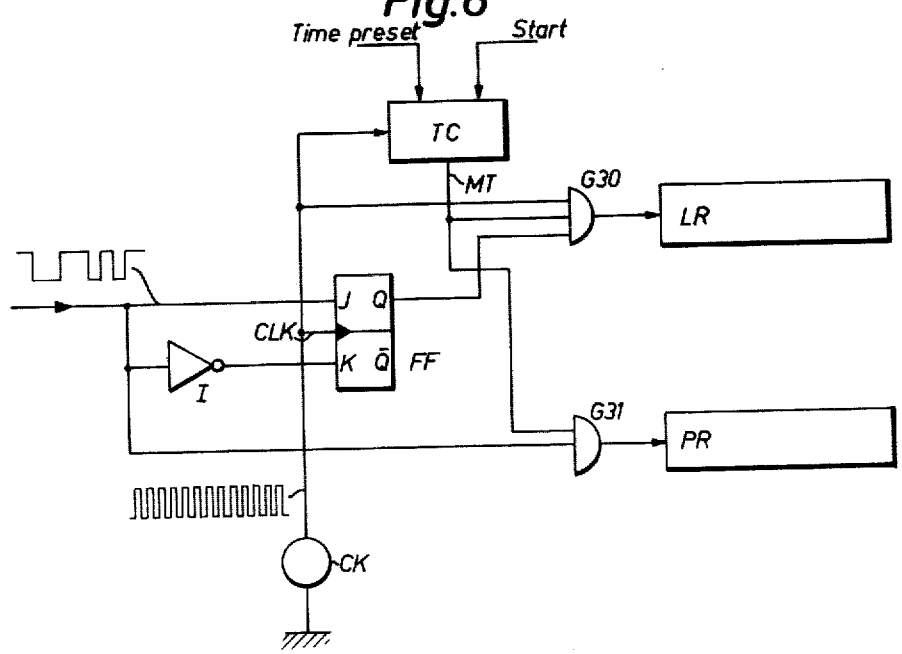
FIG. 8 is a block diagram of a modification of the circuit shown in FIG. 7.

The circuit shown in FIG. 7 has a practical drawback however. Since the clock pulses and the detected pulses are entirely independent of one another, it occasionally occurs that a clock pulse coincides with the edge of a detected pulse with a broken-off live time pulse on the output of G30 as a result. Sometimes, a pulse distorted in this way is counted into the live time register LR and sometimes not, with a consequent uncertainty in the final result. This can be overcome by using a synchronizing arrangement of the kind shown in FIG. 8.

The synchronizing arrangement is a bistable flip flop FF of J-K input logic design. To the clock input CLK of the flip flop pulses from the clock generator CK are applied. Corresponding with the trailing, decaying flank of each clock pulse, the flip flop acquires a state which is determined by the states of the J- and K-inputs. With the J-input in the high state and the K-input in the low state of potential, the flip flop acquires a state in which its output Q has a high positive potential and its output $\bar{Q}$ a low one. With the input K at high voltage and the input J at low voltage, the flip flop goes into the opposite state, that is to say the output Q is low and that $\bar{Q}$ is high.

Detector pulses which are negative right as before, are applied to the J input and their inverted counterparts, obtained from an inverter I, to the K input. In the space between detector pulses, therefore, the input J is high and input K is low which means that the output Q of the flip flop FF carries a high potential. This output is connected to an input of G30 which consequently, as before, is open to clock pulses during the measuring period. When a detector pulse arrives, the input J goes down and the input K goes high. The state of the flip flop FF is not immediately altered by this, however. It only changes state with the trailing edge of the next clock pulse to arrive, whereafter the gate G30 is blocked by the output Q. When the detector pulse disappears again, the input J goes high and the input K low, whereafter the gate G30 is opened by the next negative flank of a clock pulses. Due to this synchronizing with the clock pulses, all live time pulses passing G30 are whole and complete.

The synchronizing, it is true, means that the stopping of the clock pulses is uncertain to within + or − 1 pulse with each detector pulse since only whole pulses are passed. However, with a large number of detector pulses, and this is always the case, these errors cancel one another out and the mean number for the live time will be correct.

The calibration of and the carrying out of measuring with the system in accordance with the invention, as well as the calculation of a plate thickness value, will now be described in more detail while referring to FIG. 9.

The following equation describes gamma radiation absorption in a metal plate $$I = I_o e^{-\mu \rho d} \tag{3}$$

where $I_o$ and I are the intensities before and after passage through the plate, $\mu$ the absorption coefficient, $\rho$ the density and d the plate thickness.

However, the thickness range which the system in accordance with the invention is to cover is large and because of certain system errors small deviations from equation (3) occur. In order to maintain good measuring accuracy, therefore, in accordance with the invention the measuring range is divided up by means of calibrations into a number of sections. The deviations from equation (3) are taken account of by arranging that in each section the exponent is multiplied by a correcting factor $p_i$ (i = 1,2,3 ...). In the calibration measurements, it is not $p_i$ direct which is obtained but $p_i \cdot \mu$. There is no need to calculate $p_i$ separately so that from now on $$\mu_i = p_i \mu \tag{4}$$

will be used.

FIG. 9 illustrates how a calibration is carried out. A number of calibration plates of well-known density $\rho_k$ and well-known thicknesses $d_{k1}, d_{k2} \ldots$ are used. For each of these, in the manner described earlier, the transmitted intensities $I_{k1}, I_{k2} \ldots$ are determined extremely accurately for example as the mean value of 30 individual measurements. The logarithm of the resultant intensity values is determined. In this way, a number of well-defined calibration points $K_1, K_2 \ldots$ are obtained. At the time of calibration, in the same way the intensity passed by the diaphragm B is also determined. For a thickness range between 0.5 cm and 10 cm, it has been found that four calibration plates are sufficient, two of the plates representing the limiting values of the range.

From the calibration measurements we obtain $$\mu_1 = \frac{\ln I_{k2} - \ln I_{k1}}{\rho_k d_{k2} - \rho_k d_{k1}} \tag{5a}$$

$$\mu_2 = \frac{\ln I_{k3} - \ln I_{k2}}{\rho_k d_{k3} - \rho_k d_{k2}} \tag{5b}$$

$$\mu_3 = \frac{\ln I_{k4} - \ln I_{k3}}{\rho_k d_{k4} - \rho_k d_{k3}} \tag{5c}$$

In calculating thickness, the $\mu_i$ value should be used, which corresponds to the section in which this measuring point lies. The measuring point M has been assumed here to lie in the section between the calibration points $K_1$ and $K_2$ of FIG. 9.

During measurement an intensity measurement value $I_m$ is primarily obtained. This must be corrected for any drift in the system by multiplying it by a normalizing factor $I_{B,kal}/I_{B,norm}$ where $I_{B,kal}$ is the intensity measurement value obtained using the diaphragm only at the time of calibration and $I_{B,norm}$ is an intensity measurement value obtained in the same way at a time as close before the measurement as possible. In this fashion a normalized intensity measurement value $$I_\theta = \frac{I_{B,kal}}{I_{B,norm}} \cdot I_m \tag{6}$$

is obtained. Similarly to (5a), we obtain $$\mu_1 = \frac{\ln I_\theta - \ln I_{k1}}{\rho_\theta d_\theta - \rho_k d_{k1}} \tag{7}$$

$$\rho_\theta d_\theta = \frac{\ln I_\theta - \ln I_{k1}}{\mu_1} + \rho_k d_{k1}$$

where $\rho_\theta$ is the density and $d_\theta$ the plate thickness at the measuring temperature $\theta$. Knowing $\theta$, it is possible to calculate $\rho_\theta$ or to determine it from a table. The plate thickness at $\theta$ is thus given by $$d_\theta = \frac{\ln I_\theta - \ln I_{k1}}{\mu_1 \rho_\theta} + \frac{\rho_k d_{k1}}{\rho_\theta} \tag{8}$$

The plate thickness at a different temperature, for example 20° C., can be easily calculated from $d_\theta$.

As far as suitable intensity values are concerned, it should be emphasized that the radiation source should be chosen in such a way that with the pulse detector being used and at the minimum plate thickness which is to be measured, a maximum pulse intensity (no. of pulses per second) is obtained which does not produce any distortion in the pulse spectrum and any uncorrectable dead time losses (bearing in mind the desired accuracy), whilst with the largest plate thickness which is to be measured a minimum pulse intensity is obtained which, bearing in mind the maximum permissible measuring time, yields a counted number of pulses sufficient to provide the requisite statistical accuracy. Taking the system described in accordance with the invention, with a measured thickness interval between 0.5 cm and 10 cm, it has been found convenient to use a radiation source with a strength which after the detector, yields a maximum pulse intensity of the order of 250,000 to 350,000 pulses per second and a minimum pulse intensity of the order of 1500 pulses per second which, at a maximum measuring time of 4 seconds, yields a minimum counted number of pulses of the order of 6000. With these values, it has been found possible using the described system in accordance with the invention, to readily achieve an accuracy of 0.5% or better for plate thicknesses between 2 and 10 cm, and an accuracy of 0.1 mm or better for plate thicknesses below 2 cm. ;

What is claimed is:

1. A method of measuring plate thickness by determining the absorption of electromagnetic radiation by the plate, comprising the steps of:
providing a source of electromagnetic radiation having an energy spectrum with at least one characteristic energy;
calculating a plurality of corrected mass absorption coefficients respectively corresponding to partial thickness ranges within the total thickness range to be covered in the measurement process by measuring the intensity of electromagnetic radiation passing through each of a plurality of calibrating plates having different thicknesses lying respectively within said partial thickness ranges;
determining a first normalizing value in association with said calculating step by measuring the intensity of electromagnetic radiation passing through a plate having a predetermined thickness lying within said total thickness range;
determining a second normalizing value prior to a step of measuring plate thickness by measuring the intensity of electromagnetic radiation passing through said plate having said predetermined thickness;
placing a plate whose thickness is to be measured in the path of the electromagnetic radiation from said source and detecting the radiation passing through the plate to be measured;
measuring the intensity of the radiation passing through the plate to be measured by counting only detected radiation pulses lying within a photopeak formed by radiation having an energy level within a predetermined energy interval around said characteristic energy;
normalizing the measured intensity of radiation passing through the measured plate by multiplying the measured intensity by a factor equal to the quotient of said first normalizing value and said second normalizing value; and
calculating the thickness of the measured plate from the normalized intensity measurement and the corrected mass absorption coefficient corresponding to the partial thickness range within which the measured plate lies.

2. A method as claimed in claim 1, characterized in that in performing radiation detection pulses are generated whose amplitude is radiation energy related; and in that to count the measurement value only such pulses are passed whose amplitude exceeds a value or alternatively is within a value range, which is in a predetermined relationship to the value of the amplitude of generated pulses corresponding to radiation with said at least one characteristic energy.

3. A method as claimed in claim 2, characterized by detecting amplification-related changes in the amplitude of pulses generated at the radiation detection, and by stabilizing the measuring operation in response thereto for maintaining the predetermined relationship between said value or value range and the value of the amplitude of generated pulses which correspond to radiation having said at least one characteristic energy.

4. A method as claimed in claim 3, characterized in that for the purpose of stabilizing a first number of detected pulses are counted whose amplitude falls within a first stabilizing value range located to one side of a given value which is intended to correspond to the amplitude of generated pulses corresponding to radiation with a special characteristic energy, and a second number of pulses is counted whose amplitude falls within a second stabilizing value range which is located to the other side of the said given value; and in that said first and said second numbers are compared, and if the comparison shows that a predetermined ratio does not exist between said numbers, a control signal is generated in order to change the ratio between the value of the generated pulses and said given value, so that the predetermined ratio between said first and second numbers is achieved.

5. A method as claimed in claim 4, characterized in that the amplification is changed by means of the control signal.

6. A method as claimed in claim 4, characterized in that the special characteristic energy is said at least one characteristic energy.

7. A method as claimed in claim 4, characterized in that the stabilizing value ranges have substantially the same size and are located symmetrically in relation to said given value.

8. A method as claimed in claim 4, characterized in that prior to a counting operation for the determination of the radiation intensity after passage through a plate whose thickness is to be measured, the radiation is temporarily attenuated by a predetermined amount corresponding to a plate thickness within a predetermined thickness measuring range, whereupon said stabilizing is carried out.

9. A method as claimed in claim 8, characterized in that stabilizing is maintained during a counting operation.

10. The method of claim 8 wherein said predetermined amount is the amount of attenuation introduced by the plate having a predetermined thickness which is utilized in the steps of determining the normalizing values.

11. A method as claimed in claim 1, characterized in that the counted value of the number of pulses, representing the radiation intensity, is corrected for dead time losses.

12. A method as claimed in claim 11, characterized in that during the counting operation the live time is determined, that is to say the active time between the dead times associated with each counted pulse; and in that the counted number of pulses is corrected for dead time by dividing it by the determined live time, in order to obtain the desired radiation intensity value expressed in pulses per unit time.

13. A method as claimed in claim 12, characterized in that the live time is determined by counting clock pulses during the spaces between the counted pulses.

14. Apparatus for measuring the thickness of a plate by determining the absorption of electromagnetic radiation by the plate, comprising:

a radiation source emitting electromagnetic radiation with at least one characteristic energy;

radiation detector for generating pulses having amplitudes which are radiation energy level dependent;

means for mounting said radiation source and said radiation detector so that a plate can be placed between them and so that the radiation from the source is directed onto the radiation detector and passes through a thus positioned plate;

a circuit for counting pulses generated by said radiation detector including a radiation pulse counter and pulse amplitude sensitive means for passing to said pulse counter only those pulses having amplitudes within a photopeak corresponding to detected radiation energy in a predetermined energy interval around said characteristic energy, said pulse amplitude sensitive means including means for comparing the amplitudes of generated pulses with at least one reference value, means for detecting amplification related changes in the amplitudes of generated pulses, and means responsive to said detecting means for stabilizing the ratio between the amplitude of each generated pulse corresponding to a specific radiation energy and said reference value;

a diaphragm capable of attenuating the radiation emitted by said source by an amount corresponding to the attenuation introduced by a plate having a thickness within the range of thicknesses to be measured by the apparatus;

means for selectively introducing said diaphragm into the path of radiation between said source and said detector to thereby attenuate the radiation by said amount;

a clock pulse generator;

means responsive to a signal indicating the length of a thickness measurement for counting a predetermined number of clock pulses and for generating an enabling signal during the time of said counting to enable said pulse counter to count pulses from said radiation detector;

live time determination means comprising a counter, responsive to both said enabling signal and the pulses from said radiation detector, for counting clock pulses; and data processing means for generating said signal indicating the length of a thickness measurement, for dividing the number of pulses stored in said radiation pulse counter by the number of pulses stored in said live time determination counter to obtain a compensated pulse count, and for normalizing the compensated pulse count in accordance with the ratio of (a) the attenuation produced by said diaphragm at a time when the measuring apparatus is calibrated, and (b) the attenuation produced by said diaphragm at or near the time of the thickness measurement of interest.

15. An apparatus as claimed in claim 14, characterized in that said stabilizing means are arranged to produce a control signal for controlling the pulse amplification.

16. An apparatus as claimed in claim 14, characterized in that said detecting means includes a first pulse amplitude selector circuit for selecting from detected radiation energy related pulses a first number of pulses corresponding with a first energy range to one side of said at least one characteristic energy, and a second pulse amplitude selector circuit for selecting from detected pulse energy related pulses a second number of pulses corresponding with a second energy interval at the other side of said at least one characteristic energy, and comparator means for comparing said first and said second number of pulses.

17. The apparatus of claim 14 wherein said live time determination counter is enabled by said enabling signal and is disabled by pulses from said radiation detector to thereby count clock pulses which occur during the absence of radiation pulses.

* * * * *